United States Patent [19]

Woltron

[11] Patent Number: 4,659,071
[45] Date of Patent: Apr. 21, 1987

[54] PROCESS FOR PRODUCING A PLASTIC LEAF SPRING, AS WELL AS A PLASTIC LEAF SPRING APPROPRIATELY MANUFACTURED ACCORDING TO THIS PROCESS

[75] Inventor: Herbert Woltron, Moedling, Austria

[73] Assignee: Isosport Verbundbautiele Ges. m.b.H., Eisenstadt, Austria

[21] Appl. No.: 793,695

[22] PCT Filed: Mar. 1, 1985

[86] PCT No.: PCT/EP85/00076
§ 371 Date: Oct. 16, 1985
§ 102(e) Date: Oct. 16, 1985

[87] PCT Pub. No.: WO85/03987
PCT Pub. Date: Sep. 12, 1985

[30] Foreign Application Priority Data

Mar. 2, 1984 [AT] Austria .................................. 711/84
Oct. 25, 1984 [AT] Austria ................................ 3417/84

[51] Int. Cl.[4] ...................... B29C 67/14; B29C 67/18; F16F 1/18; F16F 1/36
[52] U.S. Cl. .................................. 267/149; 156/169; 156/192; 156/245; 156/500; 264/136; 264/258; 267/47
[58] Field of Search ................. 267/47, 148, 149, 158; 156/169, 175, 180, 192, 245, 425, 441, 500; 264/136, 258

[56] References Cited

U.S. PATENT DOCUMENTS

| | | | |
|---|---|---|---|
| 2,027,343 | 1/1936 | La Bombard | 156/192 X |
| 2,980,158 | 4/1961 | Meyer | 156/175 |
| 3,057,767 | 10/1962 | Kaplan | 156/245 X |
| 3,900,357 | 8/1975 | Huchette et al. | 267/47 X |
| 4,414,049 | 11/1983 | Jones | 267/148 X |
| 4,475,723 | 10/1984 | Meyer | 267/47 |

FOREIGN PATENT DOCUMENTS

| | | | |
|---|---|---|---|
| 106249 | 4/1984 | European Pat. Off. | |
| 1231967 | 1/1967 | Fed. Rep. of Germany | 267/47 |
| 2100835 | 1/1983 | United Kingdom | 267/47 |

OTHER PUBLICATIONS

Motor Boat and Yachting, vol. 89, Sep. 1956, p. 382.

Primary Examiner—Andres Kashnikow
Assistant Examiner—Richard R. Diefendorf
Attorney, Agent, or Firm—Bierman & Muserlian

[57] ABSTRACT

In the process for producing a leaf spring which, at least in essential springy sections, is composed of a fiber-reinforced plastic material, a continuous web (9) is formed comprised of reinforcing fibers, appropriately in the form of fiber rovings or fibrous tissues, with the reinforcing fibers being appropriately impacted or impregnated with a hardenable plastic substance, whereupon intermediate layer pieces (37) are appropriately put on the continuous web (9). The continuous web (9) is then wound up in several layers (36) on a rotating pick-up device (27) into a continuous reel (35), with the intermediate layer pieces (37) arranging themselves in the continuous reel (35) between contiguous superposed continuous web layers (36); the continuous reel (35) is then placed in a mold in such a manner that it adjoins along its entire periphery the barrel-shaped contact area of the mold chamber. Thereafter, the hollow spaces still present between the reinforcing fibers in the mold chamber are filled up by the introduction of a hardenable plastic substance, and the plastic material in the mold lastly solidifies and is cured to become the leaf spring blank.

15 Claims, 10 Drawing Figures

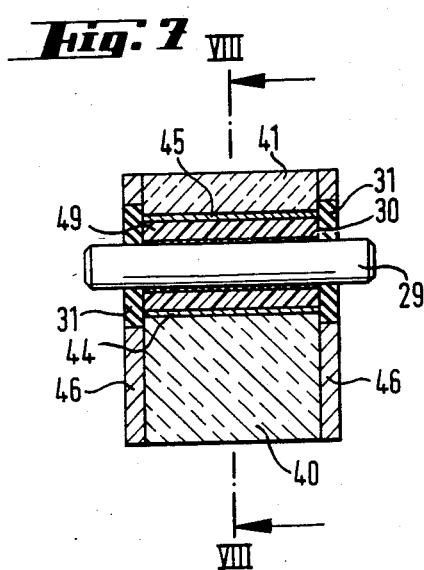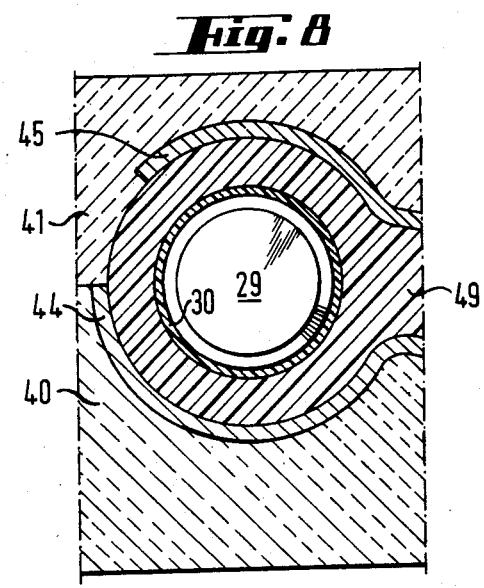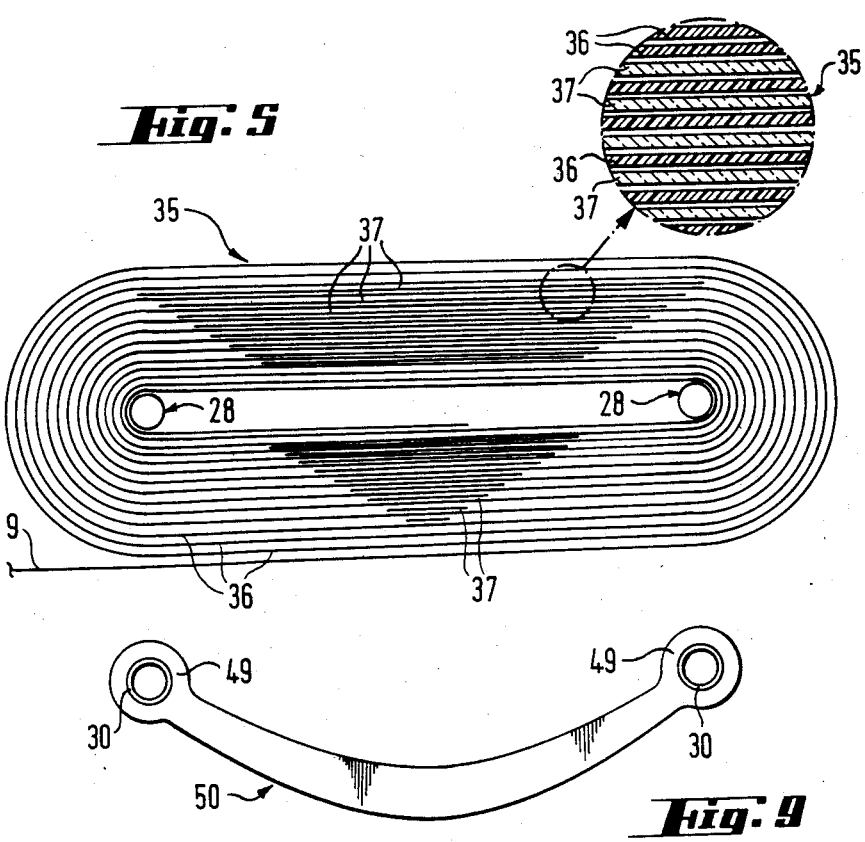

PROCESS FOR PRODUCING A PLASTIC LEAF SPRING, AS WELL AS A PLASTIC LEAF SPRING APPROPRIATELY MANUFACTURED ACCORDING TO THIS PROCESS

TECHNICAL DOMAIN

The invention is concerned with a process for producing a leaf spring which, at least in essential springy sections, is composed of a fiber-reinforced plastic material in which high-strength reinforcing fibers, appropriately composed of glass fibers, carbon fibers or other suitable fibers, pass at least approximately in the direction of the maximum extension of the spring material, and in which spring-eyes are appropriately integrated in the leaf spring body at the spring ends. It is furthermore concerned with a plastic leaf spring of a thickness that is variable along its length, appropriately manufactured pursuant to the process according to the invention.

STATE OF THE ART

Springs of the above mentioned type have been known for many years, but thus far they have found no acceptance worth mentioning in motor vehicle construction. From U.S. Pat. No. 3,900,357, for example, a process is known for the manufacture of such plastic leaf springs, in which one starts out with a strip comprised of non-woven glass fiber material and a soft matrix material on an epoxy resin basis. Blanks of such a strip are placed in a mold in several plies, one above the other, and joined under pressure and at a raised tempeerature under cure-hardening of the matrix resin to produce the finished leaf spring. Since each of the superposed strip blanks contributes only about 0.01" to the thickness of the leaf spring, then, for example, for a spring thickness of ¾" 75 superposed strip blanks would have to be used. The curing time for such a spring is assumed to be about 45 minutes.

Because of the need to insert the strip blanks into the mold, a great amount of manual labor is required for this known method. In addition, the long curing times required are an obstacle to an efficient spring production.

DESCRIPTION OF THE INVENTION

The objective of the invention is to present a new process for the manufacture of plastic leaf springs of the above mentioned type, which requires a substantially lesser amount of manual work than the process known from the aforesaid U.S. Pat. No. 3,900,357.

This problem is solved by the process according to the invention in that a continuous web is formed comprised of reinforcing fibers, appropriately in the form of fiber rovings or fibrous tissues, with the reinforcing fibers appropriately impacted or impregnated with a hardenable plastic substance, and wherein the continuous web is wound up in several layers into a continuous reel on a rotating pick-up device with at least two pick-up elements, whereupon the continuous reel, appropriately together with other components serving to construct the leaf spring, is placed into a mold, in such a manner that the continuous reel adjoins along essentially its entire periphery the barrel-shaped contact area of the molding chamber, and wherein appropriately thereafter the hollow spaces still present in the molding chamber between reinforcing fibers are filled up by introducing a hardenable plastic substance, and wherein the plastic material in the mold is solidified and appropriately hardened into the leaf spring blank.

In an advantageous embodiment of the process according to the invention for the manufacture of a leaf spring of variable thickness along its length, intermediate layer-pieces are put on the continuous web prior to its being wound up, which pieces arrange themselves in the continuous reel between contiguous superposed continuous web layers.

According to a further advantageous embodiment of the invention, the process according to the invention is characterized in that the intermediate layer pieces are composed of a fibrous laminar material appropriately impacted or impregnated with a hardenable plastic substance. The intermediate layer pieces, appropriately composed at least partially of a fibrous tissue, may advantageously be impacted with a plastic substance after they are put on the continuous web.

Pursuant to another advantageous embodiment of the process according to the invention, for the manufacture of a leaf spring in which spring-eyes are integrated at the spring-ends, the continuous reel is put in the mold in such a manner that it will surround a cylindrical recess for the spring-eyes at each of the spring-ends. Advantageously, sleeves to serve as spring-eye bushings can be introduced into the mold together with the continuous reel, with these sleeves then appropriately forming a part of each of the pick-up elements of the pick-up device in the manufacture of the continuous reel.

In yet another advantageous embodiment of the invention, the process according to the invention is characterized in that the synthetic resin contained in the continuous web and in the intermediate layer pieces is precured prior to winding up on the pick-up device.

According to a further advantageous embodiment of the process according to the invention, dielectric heat loss is produced by an electromagnetic high-frequency field in the spring material in the mold to further the hardening of the duromer plastic contained in it. The hardening of the spring material can take place advantageously in a mold which is additionally heated.

In a last advantageous embodiment of the invention, the process according to the invention is characterized in that for introducing a plastic substance into the hollow spaces remaining between the reinforcing fibers, the mold chamber is evacuated and the introduction of the liquid, appropriately duromer plastic substance thereupon takes place under increased pressure. The introduction of the liquid plastic substance into the mold chamber may be effected through one or more feeder ducts arranged in the center of the mold chamber.

The invention has the further objective to supply a leaf spring of variable thickness along its length, composed in at least the essential springy sections of a fiber-reinforced plastic, in which high-strength reinforcing fibers, appropriately composed of glass fibers, carbon fibers or other suitable fibers, running at least approximately in the direction of the maximum extensions of the spring material occurring under spring-loads, and in which spring-eyes are appropriately integrated in the leaf spring body at the spring-ends, with the leaf spring being manufactured appropriately by means of the process according to the invention.

This problem is solved in the leaf spring according to the invention in that the leaf spring body has a large number of contiguous stratified sections of fiber-reinforced plastic running in the direction of the longitudinal extension of the spring, with the two extreme sections adjoining the front surfaces of the spring and with a part of these sections extending over the entire length of the spring, and the remaining sections occupying only part of the spring length and bounded at both sides by two sections extending over the entire spring length. The maximum thickness of the sections extending only over a part of the spring length is then 2 mm, but preferably 1 mm.

DESCRIPTION OF THE DRAWINGS REPRESENTING SEVERAL ADVANTAGEOUS WAYS TO CARRY OUT THE INVENTION

The process according to the invention is described below first for the manufacture of a plastic leaf spring of a thickness variable over its length, in which spring-eyes are integrated in the spring body at both ends.

FIG. 1 shows schematically, in vertical section, an installation for the manufacture of an uncured continuous reel, from the plastic leaf spring will subsequently be manufactured.

FIGS. 2 and 3 illustrate the take up unit 27 in two different stages of the process and FIG. 4 is a plan view of take up unit 27 in the position of FIG. 3.

FIG. 5 is a view of a diagram of the continuous reel.

FIG. 6 is a cross-section of the press mold and FIG. 7 is a cross-section of the mold taken along line VII—VII of FIG. 6.

FIG. 8 is a cross-section of the press mold taken along line VII—VII of FIG. 7 and FIG. 9 is a schematic view of the leaf spring body.

Figure 1:
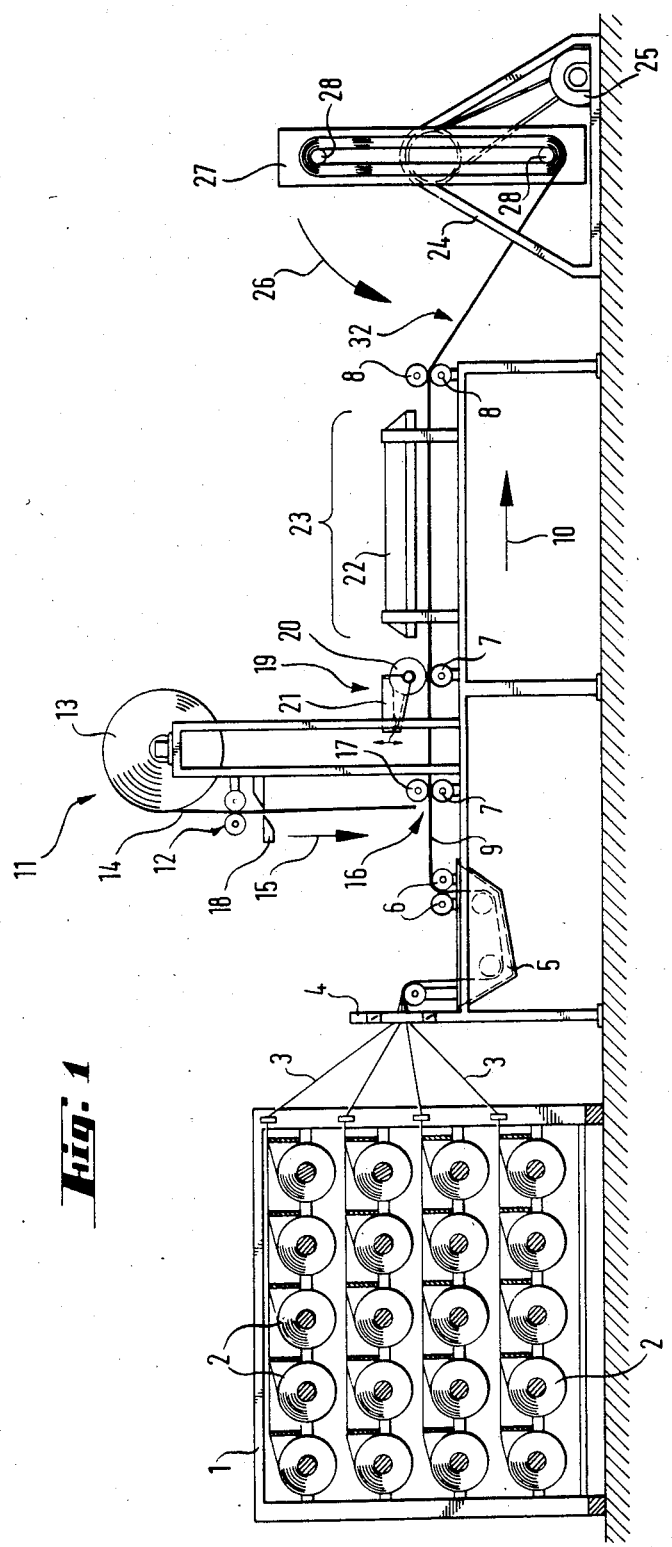

For the manufacture of this continuous reel, glass fiber roving webs 3 are drawn off rollers 2 arranged in a roller frame 1, which after passing through a carding screen 4 run through an impregnating vat 5, in which they are impregnated with a hardenable plastic substance, which may, e.g., advantageously be composed of an epoxy resin on the basis of bisphenol A and a cycloaliphatic diaminic setting agent. The thusly produced web is calibrated in a pair of squeeze rolls and—led through roller 7 and 8—is drawn off as a continuous web 9 in the direction of arrow 10. In the course of this, the continuous web 9 first passes through a depositing station 11, in which, by means of a take-off device 12, a glass cloth strip 14 is drawn off a delivery roll 13 in the direction of arrow 15, with the aim of depositing pieces of glass cloth of different lengths on specific places of the continuous web 9. This depositing operation functions as follows.

Prior to each switching on of the take-off device 12, the start of the glass cloth strip 14 hanging down at location 16 reaches barely above the continuous web 9 being transported in the direction of arrow 10. After the take-off device 12 is switched on, the start of the glass cloth strip moves down and meets with the continuous web 9, is carried along by the latter and with the aid of the guide roller 17 is then deposited on the still wet continuous web 9. With the aid of the guillotine shears 18 integrated in the depositing station 11, the glass cloth piece to be deposited is lastly cut off at the desired length, and the take-off device 12 is stopped, when the newly cut-off start of the glass cloth strip is again, as originally, barely above the moving continuous web 9.

A coating unit 19 with a coating roller 20 and a storage container 21, which is connected at the outlet side of depositing station 11 in the conveyor direction 10, serves to impact the glass cloth pieces deposited on the continuous web 9 with plastic mixture. During the passage of the deposited glass cloth piece, this coating unit 19 is lowered unto the glass cloth piece moving with the continuous web 9, and the glass cloth piece is provided with a coat of the same plastic material mixture, as has been used to impregnate the glass fiber roving strands 3.

The continuous web 9, thusly covered with glass cloth pieces and at the latter additionally coated with synthetic resin, now passes a preheating zone 23 equipped with an infrared heater 22, in which the temperature of the continuous web 9 is raised and the viscosity of the plastic mixture contained in it is thereby reduced, with the effect that the applied plastic mixture quickly penetrates into the glass cloth pieces.

The forming of the continuous reel is served by a beam-shaped take-up unit, which latter is pivoted on a rolling-up bracket 24 and kept in slow rotation in the direction of arrow 26 by a motor 25 with reduction gear; two take-up elements 28 are affixed detachably to the take-up unit at equal distances from the axis of rotation.

Figure 2:
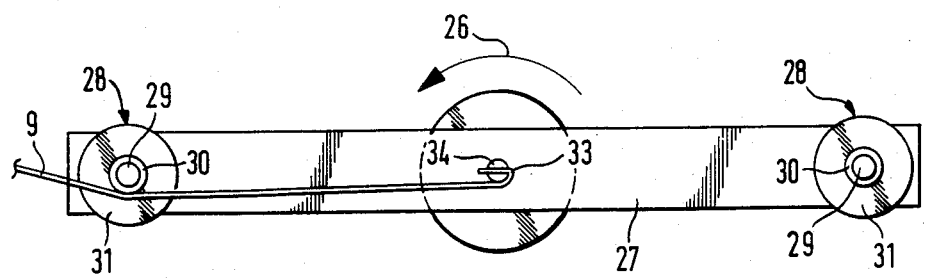
Figure 3:
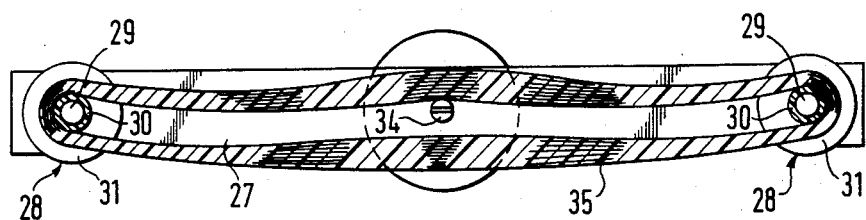
Figure 4:
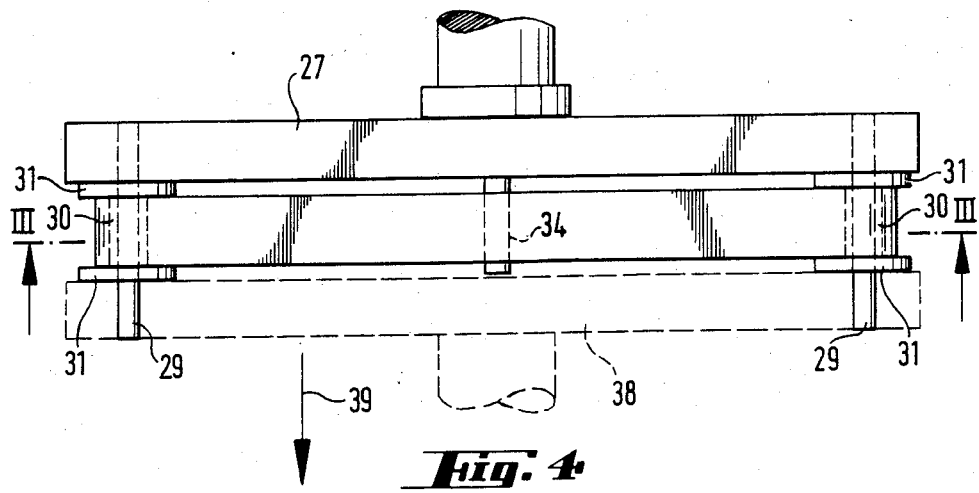

The forming of the continuous reel will now be described in detail in connection with FIG. 1 with the aid of FIGS. 2 through 4, with FIGS. 2 and 3 showing the take-up unit 27 in two different phases of the manufacturing process, namely FIG. 2 in vertical section and FIG. 3 in section along the line III—III of FIG. 4, and FIG. 4 showing the take-up unit 27 in plan view corresponding to the manufacturing phase illustrated in FIG. 3.

Each of the take-up elements consists of a bolt 29, on which a sleeve 30 of glass fiber-reinforced plastic is slid on. Disks 31 of electrically insulating material are removably attached at both sides of sleeve 30. The continuous web 9, taken off at 32 (FIG. 1), with the glass fiber pieces deposited on it is then attached with its free end 33 (FIG. 2) to a clamping device 34 provided at take-up unit 27, and is subsequently wound in several layers around the sleeves 30 of the two take-up elements 28 through rotation of the take-up unit in the direction of arrow 26. The delivered continuous web 9 is then cut and web-end 33 is released from the clamping device 34. Both of the still somewhat sticky free wet web-ends are then joined to the surface of the thusly formed continuous reel 35 which now has the form as shown in FIG. 3.

FIG. 5 shows the reel diagram of the continuous reel 35 with the continuous web 9 wound in several layers 36 around take-up elements 28, containing a plastic substance and glass fiber rovings, and with the glass cloth pieces also coated with a plastic substance, which during winding up arrange themselves as intermediate layer pieces 37 between contiguous superposed continuous web-layers 36.

In the further course of the process, the continuous reel 35, now stretched by the two take-up elements 28, is introduced in this stretched state into a press mold together with the take-up elements 28. For this, a transfer bar 38 schematically indicated with broken lines in FIG. 4 is first attached to the take-up elements 28, the attachment of take-up elements 28 to take-up unit 27 is opened, and the take-up elements 28 now joined to the transfer bar 38, together with the continuous reel 35 stretched on them, are removed from the take-up unit in the direction of arrow 39.

Figure 6:
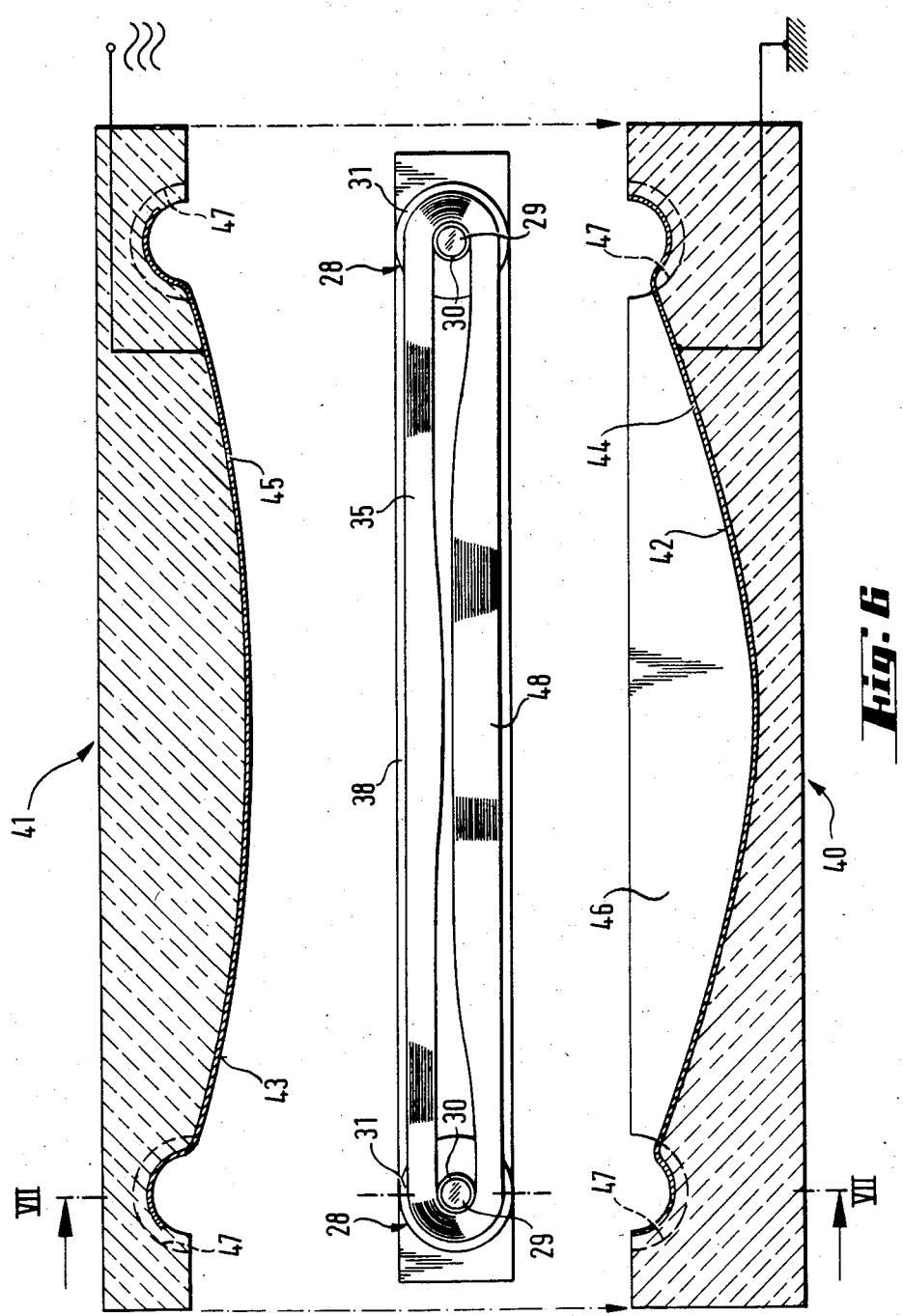

FIG. 6 shows the two mold parts 40, 41 of a press mold, which advantageously are comprised of an electrically insulating material and over nearly all their press surfaces 42, 43 they are provided with electrically conductive linings 44, 45, of, e.g. aluminum sheet. The continuous reel 35 stretched on the take-up elements 28 is now introduced between these mold parts 40, 41 by means of the transfer bar 38. The transfer bar 38 is then lowered and the continuous reel 35 is thereby introduced between the side walls 46 of the lower mold part 40, until the disks 31 of the take-up elements 28 are engaged in corresponding recesses 47, and the lower web 48 of the continuous reel 35 adjoins closely the press surface 42 of the lower mold part 40. The mold is subsequently closed by lowering the upper mold part 41. FIG. 7 shows a section through the closed mold along line VII—VII in FIG. 6. FIG. 8 shows in partial representation a section through the press mold in the section of the spring-eye 49 along line VIII—VIII in FIG. 7.

After the transfer bar 38 is detached from the take-up elements 28, the mold is placed in a press, in which the mold parts are pressed against each other. The electrically conductive linings 44, 45 are then connected to the output of a high-frequency generator, whereupon the HF-voltage is switched on. The plastic material of the pressed product received heat loss from the HF-field, whereby the pressed product is heated rapidly and is cured within a few minutes. The cured pressed product now forms a leaf spring body 50, schematically represented in FIG. 9, in which the two sleeves 30 are integrated at the spring-eyes 49 and which is removed when still hot after the opening of the mold and removal of the bolts 29 and disks 31, which latter form part of the mold arrangement.

In a concrete example of the process for the manufacture of such a leaf spring body 50 with a distance of 1500 mm between spring eyes, a spring width of 60 mm, a thickness at the spring midpoint of 33 mm and at the spring ends of 20 mm, there are used for the continuous reel fifteen glass fiber rovings of 2400 tex each, and a glass fiber cloth strip with 800 g/m$^2$ weight per unit area. The glass fiber content in the spring body amounts in total to about 70% by weight.

In an advantageous variant of the process according to the invention, a tunnel kiln may be inserted in the unit for manufacturing the uncured continuous reel 35 (FIG. 1) between the roller 8 and the rolling-up bracket 24. The tunnel kiln is passed through by the continuous web 9 covered with the intermediate layer pieces 37, during which pass the duromer plastic contained in it is precured, so that the continuous web 9 with the intermediate layer pieces 37 is then wound up as a substantially dry material onto the take-up body 28, which facilitates the later manipulation of the continuous reel 35.

The process according to the invention can also be used advantageously in the manufacture of a leaf spring which has a substantially constant thickness over its length. In this process variant the process step of depositing the intermediate pieces 37 on the continuous web 9 is eliminated.

If the process according to the invention is to be used for the manufacture of a leaf spring which is not to have a spring-eye at one or at both ends, the above described process is intended for the manufacture of the leaf spring blank, from which the undesired eye sections are then separated by means of saw cuts.

Below, additional process variants are described, in which the glass fiber-reinforcement is effected in the form of a continuous reel that is impregnated or coated with a plastic substance to a small extent only. This continuous reel is then introduced into a mold, with the fibers of the continuous reel intended to fill the mold floor as uniformly as possible. The hollow spaces remaining between the reinforcing fibers in the mold are then filled by introducing a plastic substance, and the plastic substance situated in the mold is subsequently cured.

The installation shown in FIG. 1 can be used for this variant of the process as well. Here, a sewn glass fiber support strip is used, which is fed directly to the depositing station 11, where—as described in connection with the first variant of the process—it is covered with glass cloth pieces which in the manufacture of the continuous reel serve as intermediate layer pieces 37. This glass fiber support strip covered with glass cloth pieces is then given a slight coating of a hardenable plastic substance with the aid of the coating device 19. This plastic substance, which may advantageously be comprised of, e.g., an epoxy resin on the basis of bisphenol A with a cycloaliphatic diaminic curing agent, penetrates the fiber material when passing the preheating zone 23 and, because of its adhesiveness, it sets the glass fiber cloth pieces on the glass fiber support strip. The manufacture of the continuous reel and its introduction into a mold is then effected in a manner similar to that described in connection with the first process variant.

Figure 10:
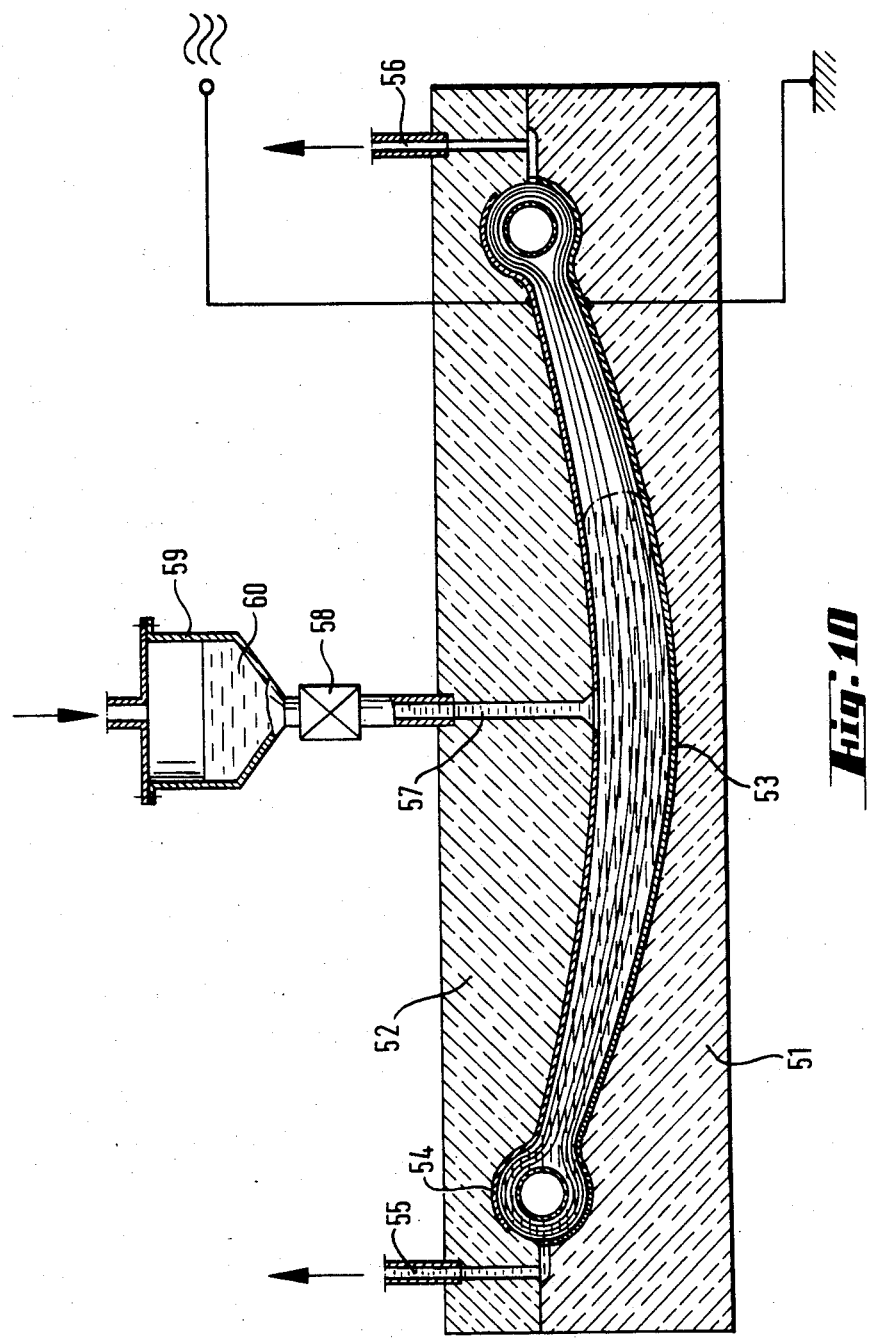
FIG. 10 is a cross-section of another embodiment of a mold of the invention.

FIG. 10 shows schematically in section, the mold used for this process variant, with the mold parts 51, 52, their press surfaces similar to those of the mold according to FIG. 6, and having electrically conductive linings 53, 54 connected to the output of a high-frequency generator. In contrast to the mold according to FIG. 6, the mold parts 51, 52 are sealed against each other when the mold is closed, so that the mold chamber can be evacuated with the aid of a pump through two air ducts 55, 56 provided at the mold ends in the upper mold part 52. The upper mold part 52 has, in addition, a feeder duct 57 which, by way of a valve 58, is connected with a feeder device 59 for the liquid plastic material 60.

After the continuous reel is placed in the mold, the mold chamber is evacuated through the air ducts 55, 56 and the HF-generator is switched on. The valve 58 is then opened, whereby the liquid plastic material 60 prepared in feeder device 59, which could also consist of an epoxy resin on the basis of bisphenol A with a cycloaliphatic diaminic curing agent, is pressed into the mold chamber under increased pressure through feeder duct 57; in the mold chamber it fills the hollow spaces still present between the reinforcing fibers.

In FIG. 10, the mold chamber is shown only half-filled in the right half of the transverse section, while the left half of FIG. 10 shows the mold chamber after the filling operation is completed. Since the filling of the mold chamber starting from the mold's midpoint progresses essentially parallel to the spring's longitudinal extension in the direction of the spring-ends, and since the reinforcing fibers to the largest part also run parallel to the spring's longitudinal extension, a possible displacement of the glass fibers caused in the filling operation by the liquid plastic material can largely be avoided.

After the filling operation is completed, the valve 58 is closed and with the HF-generator continuing switched on, the plastic material contained in the mold is cured at an accelerated pace, due to the dielectric heat loss produced in the plastic material by the electromagnetic high frequency field. The mold is then opened and the cured leaf spring body is removed while still hot.

Commercial Utilization

The plastic leaf springs according to the invention can be utilized in motor vehicles in a similar manner as the customary steel leaf springs. In contrast to steel leaf springs, their advantages lie above all in their considerably lower weight and in their not being subject to any corrosion while in use.

In addition, the plastic leaf springs according to the invention can be manufactured more economically than the previously known plastic leaf springs.

I claim:

1. A process for producing a leaf spring of elongated shape of variable thickness over its length having a leaf spring body provided with two ends which is composed at least in the essential springy sections of a fiber-reinforced plastic material in which high-strength reinforcing fibers pass at least approximately in the direction of the maximum extension of the spring material occurring under spring loads, and in which spring-eyes are appropriately integrated in the leaf spring body at the spring ends comprising forming a continuous web (9) comprised of reinforcing fibers in the form of fiber rovings or fibrous tissues, with the reinforcing fibers appropriately impacted or impregnated with a hardenable plastic substance, placing intermediate layer pieces (37) on the continuous web (9), winding the continuous web (9) in several layers into a continuous reel (35) on a rotating pick-up device (27) with at least two pick-up elements (28), whereby the said intermediate layer pieces (37) arrange themselves in the continuous reel (35) between contiguous superposed continuous web layers (36), placing the continuous reel (35) together wiht other components forming the leaf spring into a mold having a molding chamber with a cylindrical shaped contact area, so that the continuous reel (35) adjoins along essentially its entire periphery the cylindrical-shaped contact area of the molding chamber whereby appropriately hollow spaces are still present between reinforcing fibers in the molding chamber, optionally filling thereafter the said hollow spaces if present by the introduction of a hardenable plastic substance, solidifying the plastic material in the mold and curing the latter to form a leaf spring blank.

2. A process according to claim 1, wherein the intermediate layer pieces (37) are composed of a fibrous laminar material impacted or impregnated with a hardenable plastic substance.

3. A process according to claim 2, wherein the intermediate layer pieces (37) are impacted with a plastic substance after they are put on the continuous web (9).

4. A process according to claim 2 or 3, wherein the material of the intermediate layer pieces (37) is comprised of at least in part of a fibrous tissue.

5. A process of claim 1 wherein for the manufacture of a leaf spring in which spring-eyes (49) are integrated at the spring-ends, the continuous reel (35) is put into the mold so that it will surround a cylindrical recess for the spring-eyes (49) at each of the spring-ends.

6. A process according to claim 5, wherein sleeves (30) to serve as spring-eye bushings are introduced into the mold together with the continuous reel (35).

7. A process according to claim 6, wherein said sleeves (30) form a part of each of the pick-up elements (28) of the pick-up device (27) in the manufacture of the continuous reel (35).

8. A process of claim 1 wherein synthetic resin contained in the continuous web (9) and optionally in the intermediate layer pieces (37) is precured prior to the winding on the pick-up device (27).

9. A process of claim 1, wherein dielectric heat loss is produced by an electromagnetic high-frequency field in the spring material to further the hardening of the hardenable plastic substance contained in it.

10. A process according to claim 9, wherein the hardening of the spring material takes place in a mold which is additionally heated.

11. A process of claim 1 wherein for introducing a plastic substance into the hollow spaces remaining between the reinforcing fibers, the molding chamber is evacuated and the introduction of the liquid, hardenable plastic substance thereupon takes place under increased pressure.

12. A process according to claim 11, wherein the introduction of the liquid plastic substance into the molding chamber is effected through one or more feeder ducts (57) arranged in the center of the molding chamber.

13. A leaf spring of variable thickness along its length and having two ends comprised in at least the essential springy sections of a fiber-reinforced plastic, in which high-strength reinforcing fibers run at least approximately in the direction of the maximum extensions of the spring material occurring under spring-loads, and in which spring-eyes are appropriately integrated in the leaf spring body at the spring-ends produced by the process of claim 1 wherein the leaf spring body has a large number of contiguous stratified sections of fiber-reinforced plastic running in the direction of the longitudinal extension of the spring, with the two extreme sections adjoining front surfaces of the spring and with a part of these sections extending over the entire length of the spring, and with the remaining sections each occupying only a part of the spring length, and being bounded at both sides by two sections extending over the entire spring length.

14. A spring according to claim 13, wherein the maximum thickness of the sections occupying only a part of the spring length is 2 mm, but preferably 1 mm.

15. The process of claim 1 wherein the reinforcing fibers are selected from the group consisting of glass fibers and carbon fibers.

* * * * *